July 3, 1951  E. H. MEIER  2,559,508
TIME-DELAY RELAY CIRCUITS
Filed Aug. 18, 1949  3 Sheets-Sheet 3

Edwin H. Meier  Inventor
By W. O. Heilman  Attorney

Patented July 3, 1951

2,559,508

UNITED STATES PATENT OFFICE 2,559,508

TIME-DELAY RELAY CIRCUITS

Edwin H. Meier, Tulsa, Okla., assignor to Standard Oil Development Company, a corporation of Delaware Application August 18, 1949, Serial No. 111,030

2 Claims. (Cl. 175—320)

The present invention relates to an improved time delay circuit and particularly to a circuit for performing switching operations after the expiration of a predetermined period of time.

In many arts it is desirable to stop an operation within a fraction of a second or within a few seconds after the operation has been started, or to begin a second operation within a certain definate short interval of time after a first operation had begun. For example, in photographic work it may be desired to cut off a source of light after a certain period of exposure. Also, in radio transmission it may be desired to apply plate voltage to a vacuum tube at the end of a short definite interval after the filament voltage has been turned on.

A particular use for such time delay circuits is in seismograph recording in the well known methods of seismic prospecting wherein a record of reflected impulses received by seismic pickups placed at a number of points on the earth's surface at selected distances from a shot point is made on a moving strip of sensitized paper. During the making of such records it is often desired to perform various operations within certain time periods after the shot is fired or after the first reflected impulse is received, such as changing the amplifying characteristics of the seismograph amplifier as the record progresses, stopping the moving strip of paper after a certain period of time has elapsed, and the like. It is with improved circuits for performing switching and other operations after predetermined time delay periods that the present invention is concerned.

Figure 1:
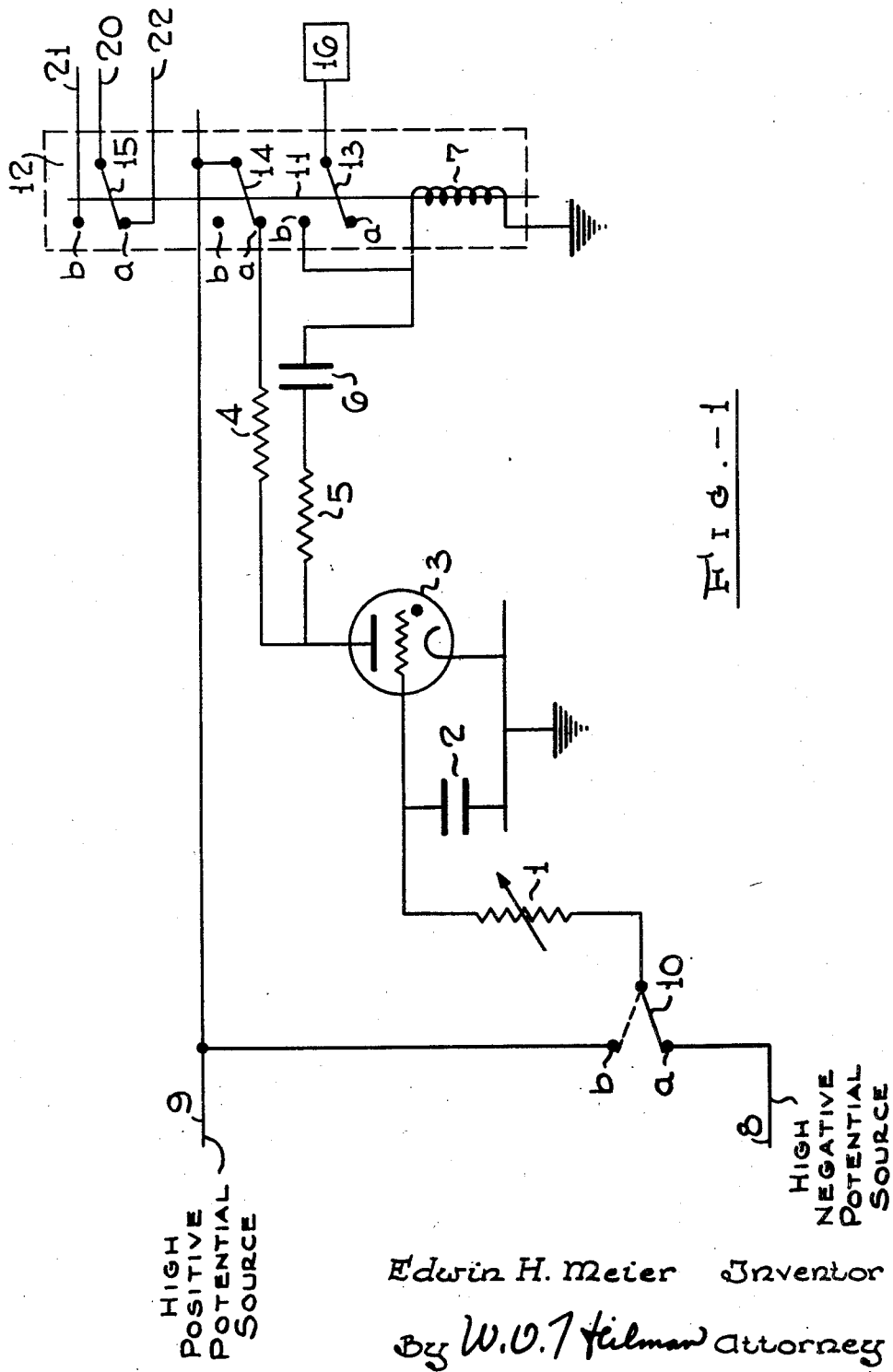
Figure 2:
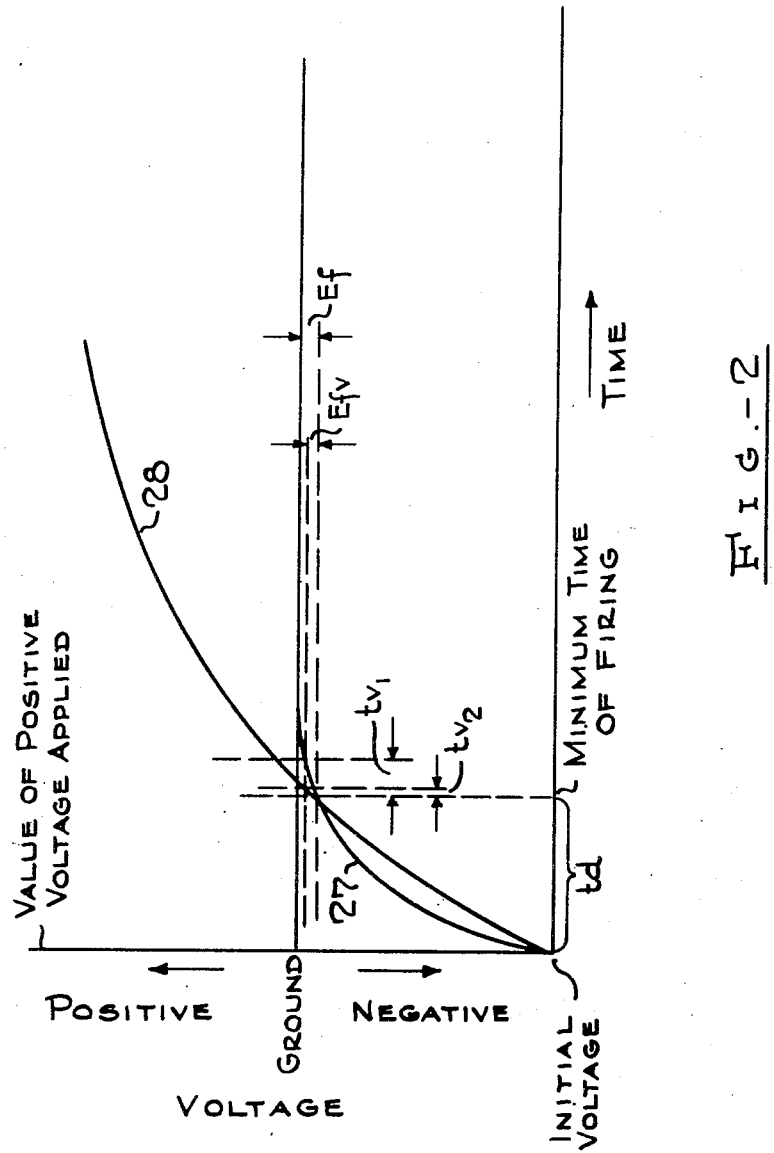
Figure 3:
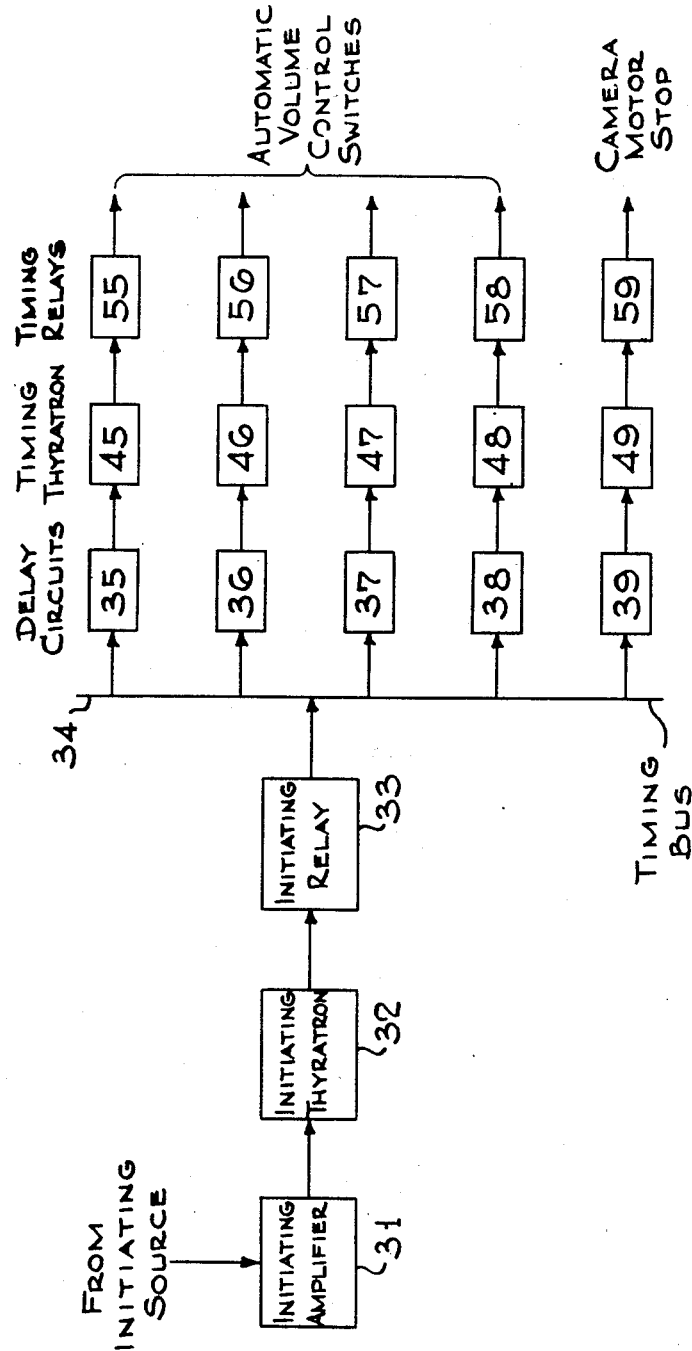

Thus, one object of this invention is to provide for an improved time delay circuit, particularly for such a circuit which will have minimum variations in delay time. It is a further object of the invention to provide an improved method and circuit for firing a thyratron tube through a resistance-capacitance time delay network. It is still another object to provide for a novel method of energizing a timing relay through a time delay circuit so as to minimize current withdrawal from the voltage source supplying the time delay circuit. These and further objects of the invention will be apparent from the ensuing description and from the drawings, in which Fig. 1 presents a schematic diagram of an electrical time delay circuit embodying the present invention; Fig. 2 is a graphical representation of the improvement in delay time control obtained with the present invention as compared to a conventional method of employing a time delay circuit; and Fig. 3 is a block diagram illustrating a practical use of the time delay circuit for recording seismic reflections.

With particular reference to Fig. 1, resistor 1 and condenser 2 constitute a resistance-capacitance network which will determine the amount of time delay that will be effected before thyratron 3 is fired to energize relay 7 which is to perform the desired switching operation. One side of resistor 1 is connected to switch 10 which has two contact positions $a$ and $b$. In position $a$, which is the initial position of the switch, connection is made with negative bus 8, and in position $b$ connection is made with positive bus 9. The other side of resistor 1 is connected to condenser 2 and to the firing grid of thyratron 3. The plate of thyratron 3 is connected through resistor 5 and condenser 6 to relay coil 7 of relay switch 12 and thence to ground. Relay switch 12 has three sets of contact elements 13, 14 and 15 adapted to be switched from contact positions $a$ to contact positions $b$ upon actuation of armature 11 caused by energizing coil 7. In the initial or $a$ position of switch 12, contact element 14 connects the plate of thyratron 3 through resistor 4 to positive potential bus 9. This connection is broken when the switch is in the $b$ position.

The operation of the circuit is now apparent. When switch 10 is moved to its $b$ position a positive charge is suddenly applied to the resistance-capacitance network comprising resistor 1 and condenser 2, causing the potential on the firing grid of thyratron 3 to become less negative until the firing voltage is reached (usually about $-2$ to $-4$ volts). When the thyratron fires, condenser 6, which has received a position charge through contact 14, is discharged to ground through the thyratron, resistor 5 and relay coil 7, causing switch 12 to move to its $b$ position. Contact element 13 then connects coil 7 to a low negative voltage supply 16 which serves to hold switch 12 in its $b$ position. As will be seen contact element 15 performs the desired switching operation in an external circuit comprising leads 20, 21 and 22.

The novel features of this time delay relay circuit are the provision for switching from a high negative potential to a high positive potential applied to the firing grid of a thyratron through a resistance-capacitance network and the provision for discharging a positively charged condenser through the thyratron, a resistor and a relay coil upon firing the thyratron. The purpose in placing resistor 5 in series with condenser 6 and relay coil 7 is to limit the current through the coil at the instant of firing. Relay switch 12 is thus thrown within a few thousandths of a second and requires very little current from voltage source 9, which is a distinct advantage when source 9 is a less efficient source of current than source 16, used for holding the switch in its $b$ position.

The desired delay time between actuation of switch 10 and the throwing of switch 12 is dependent upon the resistance and capacitance values of resistor 1 and capacitor 2 and upon the relative values of negative potential source 8 and positive potential source 9. The time delay can be expressed by the following mathematical equation:

$$\text{Time delay (in seconds)} = RC \log_e \frac{Ep+Em}{Ep+Ef}$$

where RC is the product of the resistance of resistor 1 in ohms and the capacitance of capacitor 2 in farads, $Ep$ is the value of the positive potential 9 in volts, $Em$ is the value of the negative potential 8 in volts, and $Ef$ is the negative potential on the firing grid of thyratron 3 at which the thyratron will fire. In using this equation the sign of the potential is ignored. Thus, for example, the sum of $Ep$ and $Em$ where $Ep$ is plus 90 volts and $Em$ is minus 80 volts would be 170 and not 10. If $Ep$ and $Em$ are of equal magnitude, say +180 volts and −180 volts, and $Ef$ is small in comparison, say −2 to −4 volts, then the equation becomes $$\text{Time delay} = RC \log_e 2 \text{ or } 0.693\ RC$$

For example, if a time delay of one second is desired, capacitor 2 can have a capacitance of 1 microfarad and resistor R a resistance of 1.44 megohms. Variable time delay can be provided for by employing a condenser 2 of fixed capacitance and a resistor 1 of variable resistance.

It is preferred that positive potential source 9 be one furnishing voltages in the range of +60 to +240 volts and that negative potential source 8 be one furnishing voltages in the range of −60 to −240 volts. The voltage source 16 for holding switch 12 in its b position is preferably one furnishing about 6 to 12 volts. The values of resistors 4 and 5 and of condenser 6 are readily ascertained by the requirements of the circuit and depend on the values of voltage sources 8 and 9, and the characteristics of relay coil 7. As a specific example of a time delay circuit giving a range of time delays of from 0.01 to 5 seconds, with negative and positive voltage supplies 8 and 9 of −180 and +180 volts, respectively, resistor 4 will have a resistance of 20,000 ohms, resistor 5 a resistance of 750 ohms and capacitor 6 a capacitance of 20 microfarads; thyratron 3 will fire at −2 to −4 volts; relay coil 7 will be a 6 volt coil and voltage source 16 will supply 6 volts; capacitor 2 will have a capacitance of 0.5 microfarad and resistor 1 a variable resistance range of 28,800 ohms to 14.4 megohms. Although thyratron 3 has been indicated in Fig. 1 as a gas filled triode it is of course to be understood that gas filled tetrodes and related tubes capable of performing the function of a thyratron may be used.

One of the important features of the present invention is the provision for initiating the firing of a thyratron through a resistance-capacitance circuit by switching from a high negative potential to a high positive potential. In the conventional method of firing a thyratron, switching is made from a high negative potential to ground potential, i. e., the bias potential on the cathode, to lower the negative potential on the firing grid. The advantage of firing the thyratron by switching from a high negative potential to a high positive voltage is shown graphically in Fig. 2 wherein time is plotted on the horizontal axis and firing grid voltage on the vertical axis. Curve 27 represents the change of grid voltage with time when using the conventional method of firing the thyratron and curve 28 the change with time when firing the thyratron by the method of the present invention. The distance $t_d$ along the time axis represents the nominal time delay obtained with a particular resistance-capacitance network and is determined by the intercept of the time vs. voltage curve with the grid voltage at which the tube will fire. However, this firing voltage will vary by an amount $Efv$ (say 1 or 2 volts) thus causing a variation in time delay. Now, if the voltage change with time is represented by curve 27 wherein the grid voltage approaches the ground voltage or cathode voltage, it will be seen that a small variation in firing voltage $Efv$ will result in a large variation, $tv1$, in time delay. On the other hand, when the firing method of the present invention is employed, wherein a large positive voltage is applied, the voltage vs. time curve, 28 is much steeper so that the small variation in firing voltage $Efv$ causes only a small variation in time delay, $tv2$. It is to be understood, of course, that the grid voltage does not actually become positive, for the firing of the tube prevents that; nevertheless, the curve of voltage versus time is such that if projected beyond ground voltage to the positive side it would assume the shape given.

When referring to the common ground of the circuit it is of course to be understood that this is merely a convenient reference point and that the ground is not necessarily at zero potential but may actually have a potential of −20 volts or −30 volts, for example, with respect to zero potential. Therefore, in speaking of the voltages furnished by potential means 8 and 9 it is apparent that what is meant is a certain voltage with respect to the common ground voltage of the circuit. Since the cathode of the thyratron is tied to the common ground in the circuit of the present invention, it is convenient to define the potentials of sources 8 and 9 with respect to the potential on the thyratron cathode. Thus it may be said that potential source 9 should be one whose potential is more positive than the bias potential of the thyratron cathode by at least 60 volts and that potential source 8 should be one whose potential is more negative than the bias potential of the thyratron cathode by at least 60 volts.

Furthermore in order to derive the full benefit of the invention as explained in connection with Fig. 2, i. e., in order that the thyratron will fire on the steep slope portion of the resistance-capacitance discharge curve, it is desirable that the voltage of negative source 8 and the voltage of positive source 9 be at least 30 times the normal variation in firing voltage of the thyratron. Thus, if the thyratron firing voltage varies from −1 volt to −4 volts potential sources 8 and 9 should have negative and positive voltages of at least −90 and +90 volts. In general with the ordinarily available thyratrons satisfactory operation will be obtained with an upper operating limit of about −240 volts for potential source 8 and +240 volts for potential source 9.

A practical application of the time delay circuit of this invention is depicted in Fig. 3, wherein a plurality of such circuits are used to perform various operations in seismic recording. An impulse from an initiating source, as for example from a seismic pickup, is fed into amplifier 31, and the amplified signal is used to fire an initiating thyratron 32, the latter operating an initiating relay 33, which functions in the same manner as switch 10 of Fig. 1 to change the potential on timing bus 34 from a high negative potential, e. g., −180 volts to a high positive potential, e. g. +180 volts. The timing bus is connected through a plurality of resistance-capacitance time delay networks, 35 to 39 inclusive, to an equal number of thyratrons 45 to 49 inclusive. In the same manner as described in connection with Fig. 1, each of these thyratrons is used to actuate a relay (55 to 59 inclusive) which will perform a desired switching operation. It will be apparent that time delay networks 35 to 39 represent various combinations of resistors and capacitors, connected in the same manner as resistor 1 and capacitor 2 of Fig. 1 and that these are selected to give the desired time delay periods needed for the various switching operations it is desired to perform.

Since the first kick, i. e., the first arrival of the disturbance from the shot point, will reach a seismic pickup placed near the shot point within a few hundredths of a second after the shot has been fired, this first impulse can be amplified and employed to perform a number of operations connected with the making of the seismic record. For example it may be desirable to provide for changing the automatic volume control characteristics of the seismic amplifier as the record progresses. Inasmuch as the amplitude of the first impulse received by a seismic pickup, representing the upper level of wave energy force that it is desired to detect, may differ from the amplitude of normal ground unrest, representing the lower level of wave energy to be detected, by a ratio of as much as one million to one, it is evident that in order that the traces on the seismograph record may be of usable size, the amplifier circuit associated with each seismic pickup and its corresponding galvanometer must have an amplitude control arrangement capable of holding the output reasonably constant over a wide range of input signals. One method of providing a wide range of amplitude control is to provide an amplifier having one or more stages of fixed gain amplification and filtering together with an amplification stage having variable gain in conjunction with an automatic volume control loop.

Since the first impulse received by the geophones after shooting during seismic prospecting is of fairly large amplitude it is desirable to provide for reducing the gain of the amplifier rapidly at this time for increasing signals in order to get the recorded trace under control within a few hundredths of a second after the first impulse is received. However, since later impulses representing reflecting waves will be of smaller amplitude than the "first kick" it is desirable to provide for changing the characteristics of the automatic volume control so that after the "first kick" the circuit will have moderately fast time response to decreasing signals and moderately slow time response for increasing signals so that the gain will not be reduced too rapidly when reflected impulses are received, thus permitting the reflected impulses to persist without being distorted by changes in gain during reception of the reflected impulses.

Suitable circuits for effecting such gain control are disclosed and claimed in copending application Serial No. 110,189 of Edwin H. Meier, filed August 13, 1949. As the pickups are placed at various distances from the shot point it is apparent that the impulses will reach the more distant pickups at a later time than the nearer pickups. Hence it is desirable to provide for automatic volume control time response switching at a later time for the more distant pickup amplifier circuits. This can be done by using several timing circuits as shown in Fig. 3. Thus, if 24 pickups are used, 12 on each side of the shot point, one delay circuit can be used to switch the automatic volume control circuits in the amplifiers for the first six pickups (the first three on each side of the shot point) another for the next six pickups, and so on. Thus delay circuit 35 could be used to actuate relay 55 say, 0.03 second after an impulse is received by amplifier 31, delay circuit 36 to actuate relay 56 about 0.06 second after the impulse, and so on. Relay 55 would switch the AVC in the amplifiers for the first six pickups, relay 56 for the next six pickups, and so on. Delay circuit 39 could be designed to actuate relay 59, say, 3 seconds after the initial impulse is received, and relay 59 could be used to stop the motor feeding the record paper in the seismograph and thus end the making of the record for a particular shot.

It will be readily apparent to those skilled in the art that numerous other uses can be made for the delay circuits of this invention and it is not intended that the scope of the invention be limited by the specific examples given.

What is claimed is:

1. Improved time delay circuit comprising a source of high negative potential, a source of high positive potential, a thyratron tube, a first resistor connected to the grid of said thyratron and to a grounded capacitor, a relay coil, a second resistor, a second capacitor, means connecting the plate of said thyratron to the ground of the circuit through said second resistor, said second capacitor and said relay coil in series, a third resistor connected to the plate of said thyratron, multiple contact switching means associated with said relay coil and adapted initially to connect said third resistor to said source of high positive potential and adapted upon energizing of said relay coil to connect said relay coil to a source of low potential to maintain said coil in an energized condition and to disconnect said third resistor from said source of high positive potential, said switching means being also adapted to perform connecting and disconnecting steps in a circuit external to said time delay circuit, and a second switching means adapted in a first contact position to connect said first resistor to said source of high negative potential and adapted in a second contact position to connect said first resistor to said source of high positive potential.

2. Improved time delay circuit according to claim 1 in which said high negative potential and said high positive potential are at least −60 and +60 volts respectively and in which the numerical values of said voltages are each of the order of at least 30 times the normal variation in the firing voltage of said thyratron.

EDWIN H. MEIER.

REFERENCES CITED

The following references are of record in the file of this patent:

UNITED STATES PATENTS

| Number | Name | Date |
|---|---|---|
| 1,552,321 | Lea | Sept. 1, 1925 |
| 2,049,376 | Hertwig | July 28, 1936 |
| 2,363,753 | Smith | Nov. 28, 1944 |

FOREIGN PATENTS

| Number | Country | Date |
|---|---|---|
| 56,246 | Norway | Mar. 2, 1936 |